United States Patent
Rose et al.

(10) Patent No.: US 9,596,580 B2
(45) Date of Patent: Mar. 14, 2017

(54) SYSTEM AND METHOD FOR MULTI-FRAME MESSAGE EXCHANGE BETWEEN PERSONAL MOBILE DEVICES

(71) Applicant: NEXomni, LLC, Bethesda, MD (US)

(72) Inventors: David H. Rose, Bethesda, MD (US); Jeffrey M. Rose, Bethesda, MD (US)

(73) Assignee: NEXOMNI, LLC, Bethesda, MD (US)

(*) Notice: Subject to any disclaimer, the term of this patent is extended or adjusted under 35 U.S.C. 154(b) by 114 days.

(21) Appl. No.: 14/679,177

(22) Filed: Apr. 6, 2015

(65) Prior Publication Data

US 2015/0289118 A1    Oct. 8, 2015

Related U.S. Application Data

(60) Provisional application No. 62/072,571, filed on Oct. 30, 2014, provisional application No. 61/976,692, filed on Apr. 8, 2014.

(51) Int. Cl.
*H04W 4/14* (2009.01)

(52) U.S. Cl.
CPC .................................... *H04W 4/14* (2013.01)

(58) Field of Classification Search
None
See application file for complete search history.

(56) References Cited

U.S. PATENT DOCUMENTS

| | | | |
|---|---|---|---|
| 6,243,104 B1 * | 6/2001 | Murray | G06F 17/243 345/629 |
| 7,908,620 B2 | 3/2011 | Matsuzaki | |
| 8,126,994 B2 * | 2/2012 | Richards | A63F 13/12 345/633 |
| 8,127,044 B2 * | 2/2012 | Morard | H04N 7/17318 709/247 |
| 8,285,886 B1 * | 10/2012 | Vass | G06F 3/165 710/15 |
| 8,522,289 B2 | 8/2013 | Athsani et al. | |
| 9,113,172 B2 * | 8/2015 | Hong | H04N 19/70 |
| 2002/0033825 A1 * | 3/2002 | Satake | G06T 1/00 345/473 |
| 2003/0135559 A1 | 7/2003 | Bellotti | |
| 2006/0224940 A1 | 10/2006 | Lee | |

(Continued)

OTHER PUBLICATIONS

PCT International Search Report and Written Opinion, International Application No. PCT/US15/24439, Jul. 28, 2015, 8 pages.

*Primary Examiner* — Ashish K Thomas
(74) *Attorney, Agent, or Firm* — Edell, Shapiro & Finnan, LLC

(57) ABSTRACT

Embodiments of the present invention provide an improved system, method, and computer program product for electronic messaging that augments and/or expands a user's ability to express his thoughts or ideas, while supporting "quick" message generation and delivery in near real-time. More specifically, the present invention embodiments allow a user to communicate effectively and efficiently via an electronic message comprised of consolidated, small/short media files or "frames" that can be easily generated and viewed as a single, sequential cohesive message. Multimedia frames may be comprised of: text, images, visual motion clips (video or animation) and/or sound data. These frames may display in a variety of sizes and patterns.

18 Claims, 8 Drawing Sheets

High-level Architecture: Multi-Frame Message Delivery System

(56) References Cited

U.S. PATENT DOCUMENTS

| | | | |
|---|---|---|---|
| 2007/0168436 A1* | 7/2007 | Andam | G06Q 10/107 709/206 |
| 2009/0147010 A1* | 6/2009 | Russell | G11B 27/034 345/473 |
| 2010/0158133 A1* | 6/2010 | Yin | H04N 21/235 375/240.26 |
| 2012/0047446 A1 | 2/2012 | Hamilton et al. | |
| 2012/0127196 A1 | 5/2012 | Landry | |
| 2012/0299955 A1 | 11/2012 | Fagans et al. | |
| 2013/0038613 A1* | 2/2013 | Kim | H04M 1/72555 345/473 |
| 2013/0113806 A1* | 5/2013 | Naveh | G09G 5/227 345/467 |
| 2014/0019839 A1* | 1/2014 | Dargahi | G06F 17/24 715/209 |

* cited by examiner

Frame (Block) Screen Configurations

Multi-Frame Message: Linked & Embedded within another Messaging System

Logical View: Externally Triggering a Multi-Frame Message

SYSTEM AND METHOD FOR MULTI-FRAME MESSAGE EXCHANGE BETWEEN PERSONAL MOBILE DEVICES

CROSS REFERENCE TO RELATED APPLICATIONS

This application claims priority from U.S. Provisional Patent Application Ser. Nos. 61/976,692, entitled "System and Method for Creating and Exchanging Multi-Frame Electronic Messages Between Personal Mobile Devices" and filed on Apr. 8, 2014; and 62/072,571, entitled "System and Method for Multi-Frame Message Exchange Between Personal Mobile Devices" and filed on Oct. 30, 2014. The disclosures of these provisional applications are incorporated herein by reference in their entireties.

BACKGROUND

1. Technical Field

The present invention embodiments are in the technical field of computer communications. More particularly, embodiments of the present invention are in the technical field of computer communications and electronic messaging.

2. Discussion of Related Art

Electronic messaging systems are well known and are used globally, today. Typically, electronic messaging systems, such as email and text messaging platforms are text based, with the ability to attach files, such as documents, video, sound, etc. In addition, certain services provide the capability for users to communicate by sending or exchanging short video clips. With all present electronic messaging systems, the capability to convey meaningful/useful information is essential, as is the capability to deliver this information instantly or in near real-time. The success of electronic messaging systems is well known, and has evolved as new formats have expanded the communicative value of information exchanged and the ease with which this can be done. Multi-media communications through entities such as FACEBOOK and TWITTER have changed fundamental ways in which individuals communicate.

A key factor to the success of an electronic messaging system is providing a platform that enables users to produce messages as efficiently and effectively as possible. In general, for a messaging or communications system to be successful today, it must be easy to use and allow for quick information exchange. Along with this, it must enable users to effectively express thoughts and ideas. As those who communicate via electronic messaging seek new ways to express thoughts and ideas, the challenge of developing formats and mediums to maximize expression has grown.

Text messages and standard email messages can be created and delivered quickly, but are not typically rich in visual content, although static images may be embedded and both images and video may be attached. Video messaging may be rich in visual content but typically requires more time/effort to generate and view than a text based message. In addition, video messaging may not be well suited to convey a precise message, as with written text.

SUMMARY

Accordingly, it is an aspect of embodiments of this invention to provide an improved system and method of electronic messaging that augments and/or expands a user's ability to express his thoughts or ideas, while supporting "quick" message generation and delivery in near real-time. More specifically, the invention embodiments will allow a user to communicate effectively and efficiently via an electronic message comprised of consolidated, small/short media files or "frames" that can be easily generated and viewed as a single, sequential cohesive message. Multimedia frames may be comprised of: text, images, visual motion clips (video or animation) and/or sound data. These frames may display in a variety of sizes and patterns.

The electronic messaging system described herein will enhance communications between users via their end-user devices. More specifically, embodiments of this invention seek to improve and enhance messaging between Personal Mobile devices (PMD's), such as mobile phones, tablets, laptops, etc. The most common PMD, and preferred device platform for an embodiment of this invention is the Smartphone. It should be understood that an embodiment of this invention may apply to other devices or environments where electronic messages may be exchanged and displayed.

Yet another aspect of a present invention embodiment is to create a sequential message on a Smartphone/PMD, comprised of multimedia frames, or "frames" that can be visualized as a series of icons on a Smartphone/PMD screen, where these icons can be tapped to create or modify frame content and/or duration, and where the icons can be "dragged and dropped" to change the sequence of message elements.

Yet another aspect of a present invention embodiment is to create a sequential message on a Smartphone/PMD, comprised of multimedia frames, where the content for frames can be accessed directly from files resident on the Smartphone/PMD, or from a remote source/server.

Still another aspect of the present invention is to provide a method to allow a user to create a sequential message on a Smartphone/PMD, comprised of multimedia frames, where frames can be added iteratively to build a message. Each frame, represented by an icon on the Smartphone display, contains a unit or part of the full message. This part may be designed individually and arranged in an order to convey the user's message.

Still another aspect of a present invention embodiment is to create a sequential message on a Smartphone/PMD, comprised of multimedia frames, where the frames may be displayed in an array of patterns. For example, the message may display in frames/blocks from right to left and appear to "snap" into place and momentarily enlarge. Alternatively, the message may display a set of frames on the Smartphone window and reveal frames contents in sequence or a pattern. Another example would be to reveal a row of frames by scrolling up or down on the screen. Still another example would be to animate the appearance of frames, by spinning, rotating, dissolving, fading, etc.

Yet another aspect of a present invention embodiment is to create a sequential message on a Smartphone/PMD, comprised of multimedia frames, where frames can be freshly captured and created "live", or "on-the-spot" by the user, where the user can take a "live" photograph or video clip and include it as a frame in the message.

Yet another aspect of a present invention embodiment is to create a sequential message on a Smartphone/PMD, comprised of multimedia frames, where an image or clip stored on the user's phone can be included as a frame in the message.

Still another aspect of a present invention embodiment is to reply directly to the sequential message sender, or all recipients. Alternatively, recipients could leave comments that would be associated with the message and viewable via a posting on users' Smartphones or websites.

Still another aspect of a present invention embodiment is to create a sequential message on a Smartphone/PMD, comprised of multimedia frames, where multiple users can iteratively modify the message; where the recipient may append or edit the message with additional frames. An example would be to essentially create a "chain" message.

Yet another aspect of a present invention embodiment is to create a sequential message on a Smartphone/PMD, comprised of multimedia frames, where frames can be saved/accessed in a "favorites" file to optimize access to selected media frames, in order to facilitate expedited message creation.

Yet another aspect of a present invention embodiment is to create a sequential message on a Smartphone/PMD, comprised of multimedia frames, where frames content must meet requirements for file size, or be sized to meet requirements. And for motion content, media must meet, or be sized to meet the requirement for a maximum length of time.

Still another aspect of a present invention embodiment is to calculate an overall message length and file size in order to meet message format requirements for generating a message.

Yet another aspect of a present invention embodiment is to create a sequential message on a Smartphone/PMD, comprised of multimedia frames, where the frames are combined and converted into a format that is suitable/compatible with specific message platform functions and processing.

Yet another aspect of a present invention embodiment is to create a sequential message on a Smartphone/PMD, comprised of multimedia frames, where the MFM formatted message code can be read and displayed natively in any messaging application.

Still another aspect of a present invention embodiment is to create a sequential message on a Smartphone/PMD, comprised of multimedia frames, where media frames or galleries of media frames may be viewed and purchased from a third party.

Yet another aspect of a present invention embodiment is to provide a system/method for third party media frames or media frames gallery providers to register their products and make them available for sale to users.

Yet another aspect of a present invention embodiment is to provide a system/method to direct users to valid/authorized third party media frames or media frames gallery providers.

Still another aspect of a present invention embodiment is to provide a system/method to receive payment or bill third party media frames or media frames gallery providers.

An option for a present invention embodiment is to vary the availability of media files to be used in a message based on GPS location or other criteria. For example, a user may travel to a remote location, and based on the GPS location, they would have access to, "stamp" or "badge" media files that would verify their location, achievement, etc. These stamps could then be used in the construction of a message.

Additional content, such as advertising may be introduced into a message and be delivered from a variety of sources.

Another aspect of a present invention embodiment is to provide an improved visual and functional representation of the Multi-Frame Message in order to contain key message functions and enhance the perception and utility of the multi-frame message as a single, cohesive message.

Yet another aspect of the present invention embodiment is to provide a system/method to embed or trigger a Multi-Frame Message within another messaging system.

Another aspect of the present invention embodiment is to provide a system/method to deliver advertising and/or information in the form of a Multi-Frame Message, and further, to trigger such a message by scanning a Quick Reference (QR) code (or similar readable code), or via a Near field Communication (NFC) transmission.

Still another aspect of the present invention embodiment is to provide an improved system/method to select, associate and play audio with a multimedia message/Multi-Frame Message (with individual frames and over all frames in a message).

Still another aspect of the present invention embodiment is to provide a method for Multi-Frame Message (MFM) recipients, who do not have the MFM application, to view a representation of the MFM message.

Still another aspect of the present invention embodiment is to provide an alternative multi-frame structure, where frames can be displayed in series, from multiple users who are communicating with each other.

Still another aspect of the present invention embodiment is to provide a method for "pre-constructed" Multi-Frame Messages to be included within the MFM messaging application/system.

Still another aspect of the present invention embodiment is to provide a method to display frames based on the content or characteristics of other frames in the Multi-Frame Message.

The above and still further features and advantages of the present invention will become apparent upon consideration of the following detailed description of example embodiments thereof, particularly when taken in conjunction with the accompanying drawings, wherein like reference numerals in the various figures are utilized to designate like components.

DETAILED DESCRIPTION OF EXAMPLE EMBODIMENTS

Multi-Frame Messaging (MFM)

Figure 1:
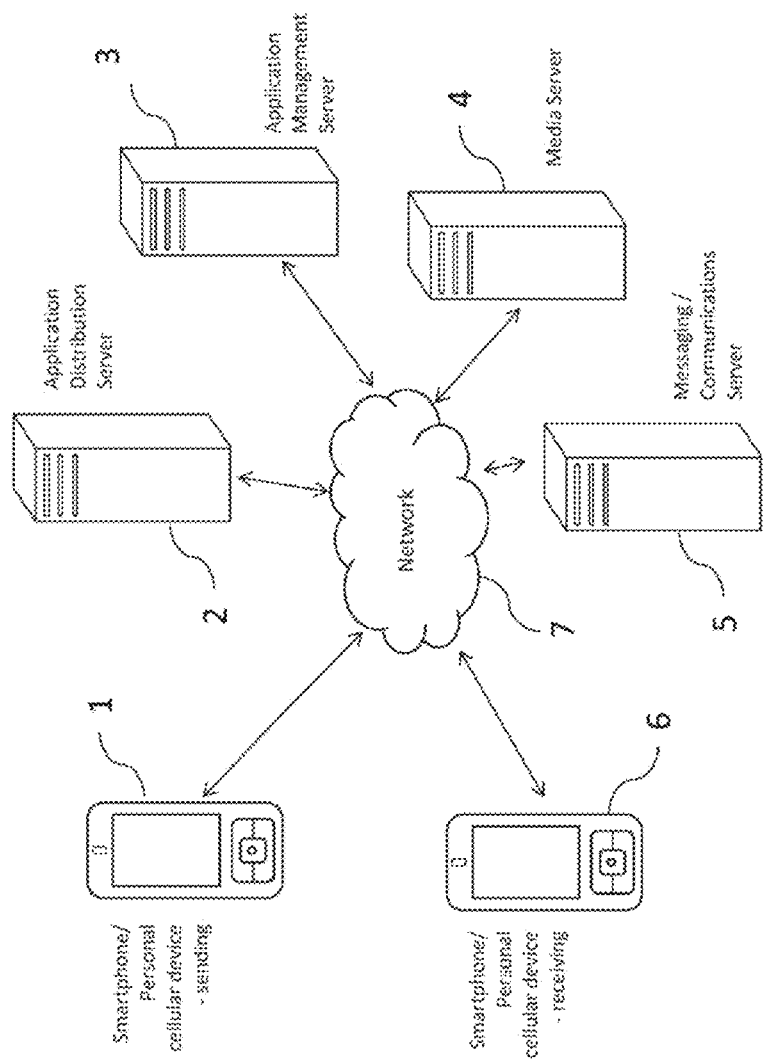
FIG. 1 is a high-level architectural illustration of a computing environment of an embodiment of the present invention.

In an embodiment (FIG. 1) of the MFM system, the Multi-Frame Messaging (MFM) application is resident on a Smartphone or similar Personal Cellular Device (PCD) (1). It is accessed by a user to create a multi-frame message which is sent via a network to a recipient on another Smartphone or similar Personal Cellular Device (PCD) (6).

The Multi-Frame Messaging (MFM) application may be made available to users via an Application Distribution Server (2) that is connected to the network (7). Backend application processing, administration and functions such as access control and general application management are executed by the Application Management Server (3). Media and related data used within messages is uploaded, downloaded, stored and processed on the Media server (4). Media/data files are made available to users to produce messages.

The Messaging/Communications Server (5) processes messages. Data for message generation are received and processed by the Application Management Server (3) from the sending Smartphone or similar Personal Cellular Device (PCD) (1). The message is then sent via the Network (7) and Messaging Communication Server (5) to message recipients on their Smartphone or similar Personal Cellular Device (PCD) (6). The Messaging Communication Server (5) sends a push notification to message recipients to alert them that a message is available for viewing on the Messaging Communication Server (5). The Messaging Communications Server (5) would also typically store message data. In addition, if the message recipient does not have the MFM application on his/her Smartphone/PCD, the Messaging Communications Server (5) will send an alternative message (typically via email or text message) inviting the recipient to download the MFM application to view the message.

In an embodiment (FIG. 2) of the MFM system, the Multi-Frame Messaging (MFM) application (1a) is resident on a Smartphone operating system on device (1) and is accessed by a user to create a Multi-Frame Message. Within the application (1a), the user can select separate media files (1b) and consolidate them into a single, multimedia message (1c). Media files may be accessed/pulled from local Smartphone/PCD storage (1) or accessed/pulled from Media Server (4) file storage (4a) and generated/processed on the Application Management Server (3). "Pay-to-use" Images or Image Galleries may alternatively be purchased using the Financial Transaction Process (8). The purchase is made by the user through his/her Smartphone/PCD via the Application Management Server (3), which accesses pay-to-use images/galleries (4a) on the Media Server (4). Image/gallery providers may upload/edit images/galleries via a Web Browser (9) of a client system by accessing the Application management Server (3) and manipulating media files (4a) on the Media Server (4). Users may download the MFM application from an Application Distribution Server (2). Users may send a message via the Application Management Server (3), which accesses the Messaging/Communications Server (5), which sends a push notification to the receiving user's Smartphone/PCD (6).

In an embodiment (FIG. 3), a user can create a Multi-Frame Message [Step 1] on a Smartphone/PCD (1), with application (1a). When opened, the MFM application presents multiple icons on the device display that correspond to message frames. The icons are arranged in the order of the message sequence and may be dragged and dropped to modify the message sequence. In addition, an input field for addressing recipients [Step 6] is provided, and selectable buttons for previewing [Step 5] and sending a message [Step 7] are provided.

When a user taps an icon on the Smartphone screen [Step 2], it opens a screen displaying that icon in a larger format, such that the user can easily view and manipulate data/content for that icon/message frame [Step 4]. For each frame, when opened, the user may add/edit content of the following types: Text, Images, and Clips (animated or motion video) or "live" photos or video [Step 3]. In addition sound may be added to each frame, the background color/image may be modified and the duration of display may be changed, when applicable [Step 4]. When the user selects an option (Text, Images, Clips, background color/image, sound), a listing or gallery of specific content available for that media type is accessed/retrieved from a file (4a) on the Media Server (4) and displayed. The user may also select a file located on their Smartphone/PCD device (1)(1b). The user may select from the list/gallery displayed or choose other files/galleries to display. In addition, the user can perform a search on available files/galleries, and/or frames can be saved/accessed in a "favorites" file to optimize access to selected media frames, in order to facilitate expedited message creation.

Multiple Media Servers (4) may provide media/content files (4a). In addition, an Application Management Server (3) may be used by the MFM application to determine available Data/Media Servers (4). The Application Management Server (3) can also track uploads, downloads, purchases, etc. of media/content to/from the external Media Servers (4), and can communicate with a Financial Transaction Process(s) (8) to execute licensing, billing, payment and other related financial transactions.

The user can select media from a gallery (1b, 4a) by tapping the media icon on the screen. This enters this media into the corresponding frame for the message (1c). Subsequent frames are populated in the same manner [Step 2, 3, 4]. Note: one or all frames may be used. Once the user has added the desired frames, he can preview the message [Step 5] by selecting the "preview" feature. When the user taps the button on the screen, the frames of the message are concatenated and display in sequence as a unified media message, with both visual and audio data (if applicable) produced. The message may also be presented as a sequence of separate frames that display in a pattern. In an embodiment, the user can select the display mode; the manner in which the frames display to the recipient (sequential, pattern, etc.). If the user is satisfied with the message composition, he can enter a destination address(es), which may be email, telephone number or other unique address [Step 6] and send the message [Step 7] via the Messaging/Communications Server (5) over a network (7). Notification is typically achieved via "Push" technology, where the recipient is alerted that they have received a message. The message recipient receives the message [Step 8] and may view the message [Step 9] via the application on Smartphone/PCD device (6), and reply or forward, delete, etc. and perform typical functions that can be performed on email or other message systems [Step 10]. During message creation [Steps 2, 3, 4, 10] the user may also edit the message by selecting individual frames and manipulating those frames. And, the user can rearrange the order of the message frames by dragging and dropping them on the screen. As appropriate, media types may be combined. For example, text may overlay an image or clip.

Message Architecture: Elaborating further on the aspect of the Multi-Frame Message, MFM functionality may be enhanced and optimized by utilizing a set of discrete multimedia files that are associated with frames, within the overall message file. Discreet frame files are also required for the MFM to function with multiple message display modes, as described previously. Here, a frame is an individual, discrete display component of the MFM. Each frame is comprised of multimedia files which are organized in a particular order and hierarchy according to input from the message creator. For any given frame, there may be multiple, multimedia components/files associated that work in series or unison to create a unique multimedia frame within the MFM. For example, the message creator might create an initial frame with text, then add an image file as a background, then create a caption, then add an audio file—all of which are associated with the frame. These separate units/files are associated with the frame during creation, and when the frame is saved as a component of the MFM, all media files are associated but remain discrete. This architecture is unique to this messaging system and solves several problems, such as distortion of message frames during display of the message. Maintaining the correct position and proportion of frames is critical to achieve the effective and unique display characteristics of the MFM. For example, if the aspect ratio of the viewing screen changes, or available space on the viewing screen varies, it would typically cause a problem when trying to display a standard, compiled/formatted multimedia file, where components are not discrete. In such a situation, the presentation of frames would appear altered—a square, for example, might become stretched into a rectangle and the position of the frames might display in unintended locations. In addition, the MFM architecture allows messages to remain dynamic when saved, sent or viewed. This architecture also has additional advantages in terms of message performance. The MFM does not need to be rendered as a video file or converted to a standard format in order to display. Such operations typically require additional applications and/or additional processor resources. This is especially important in that messaging systems must operate as close to real-time as possible. Users typically need to send, read and respond to messages with minimal latency. Thus, this invention solves an important problem by generating a cohesive display of multiple multimedia components that appear as a singularly rendered unit, while avoiding the undesirable processing overhead of generating, loading or playing a video file.

Regarding display of the MFM, because the files remain discrete, display quality is optimized and individual display functions (and audio functions, if applicable) execute to present the message using the native device's operating system, such that message can be made to play immediately and appears as a contiguous series of independent multimedia frames. This means that fames (multimedia content) can display dynamically, where they may be individually tailored and/or optimized for size, position, duration, animation, effects, etc. This also allows for comprehensive editing and updating after a message has been created, saved or sent, and it allows for changes after message creation, to message behavior and display, via changes to message instructions, within the application. For example, a frame may spin in to position, rather than zoom into position, according to message instructions. It also avoids dependence on third party display programs, such as video players. Finally, this architecture supports visual layering, where elements of various frames may be ordered dynamically, or overlap or appear in unison, depending on instructions from the code that animates the MFM display.

Optimizing Multi-Frame Message Data Transfer: Per description of the embodiment above, where the Multi-Frame Message is comprised of discrete file components, the message's parts can be manipulated individually, and thus can be transmitted in manageable sections. For example, if an MFM is comprised of multiple frames, when the message is processed (saved, transmitted, etc.), its components can be prioritized and sent sequentially based on that prioritization. In this case, data associated with the first frame to display would be transmitted ahead of subsequent frames. The second frame would follow the first, and so forth. In this way, just-in-time data delivery is provided for message frames. The message can then begin playing on the receiving side before all the message data has arrived. Typically, message routing and execution information (data) would be sent ahead of, or be coupled with priority content data to achieve the aforementioned capability. Thus, this invention provides an alternative data transmission process, to overcome the problem of latency that occurs due to the inability to quickly transfer data, when moving large files over a network.

Also, to achieve additional efficiencies, multiple tasks can execute concurrently, based on an algorithm that processes data transfer according to predefined/coded specifications. Concurrent data transfer tasks might occur where a large amount of data is associated with a frame that is sequenced in the latter part of the message. The data management algorithm would calculate that in order for this frame to display in time (correctly), data from that frame would need to begin transmission concurrently with a frame that is sequenced to display earlier in the message. Using this method, frame data loads according to the order of display priority, concurrently with data from a larger file or files, which require more transmission time.

Another aspect of this invention is that message content can also be separated from message execution instructions and routing information to achieve further efficiencies. In this case, a message can be routed and begin execution ahead of receipt of content data (as discussed previously). Further, portions of the MFM message, such as message execution instructions, routing information, and content file pointers can be loaded/stored locally on the user device, with other message data, such as frame content, stored remotely (remote Application Management Server, or similar device). This also improves loading of messages for viewing. It avoids having to transmit the entire message file from remote storage, and it also reduces the amount of message storage required for the entire message to be stored on the local (smartphone) device.

This message architecture further supports all invention aspects in this document. For example, where mining of data within the MFM is discussed, it should be understood that analysis and processing of data could be better managed by manipulation of the specific components of the MFM, per the described message architecture. In this case, separating content data to be measured and analyzed from message display execution and routing data would enable more robust and efficient processing of the data captured, since content data would be isolated.

Figure 2:
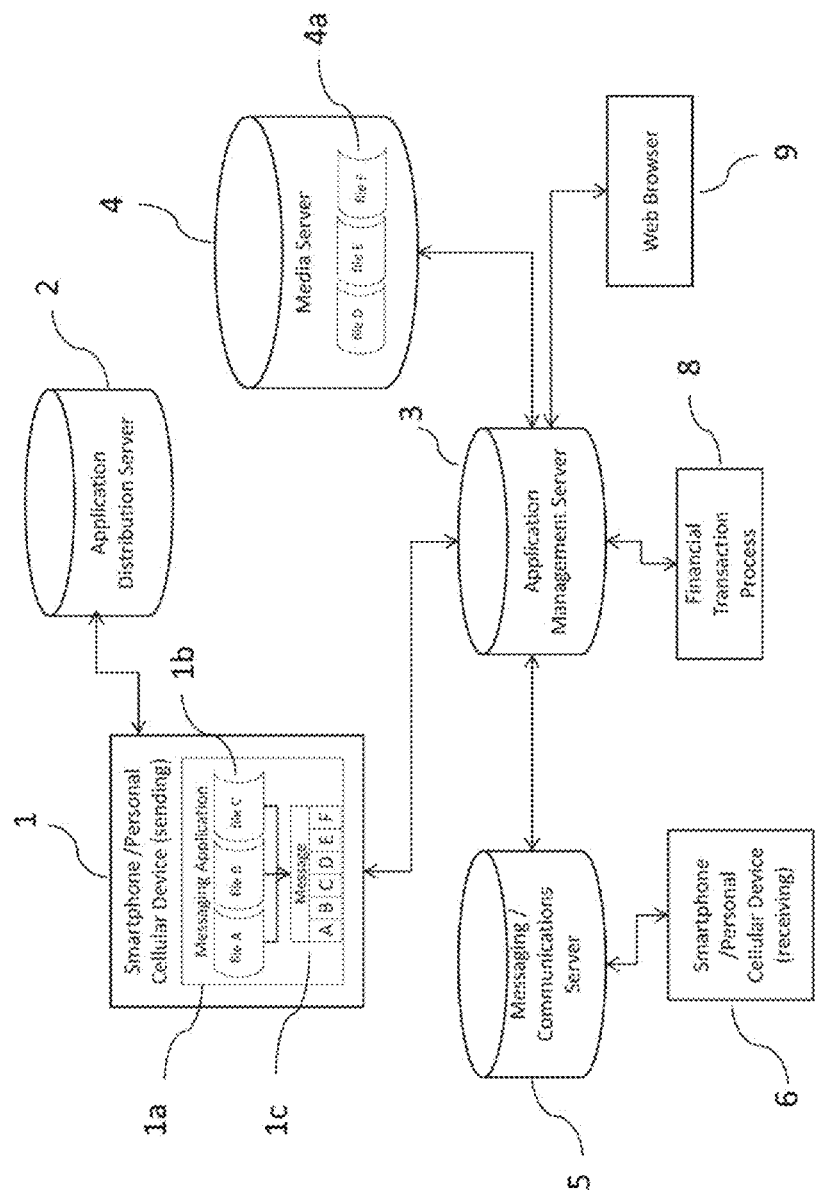
FIG. 2 is a logical view of an embodiment of the present invention.
Figure 5:
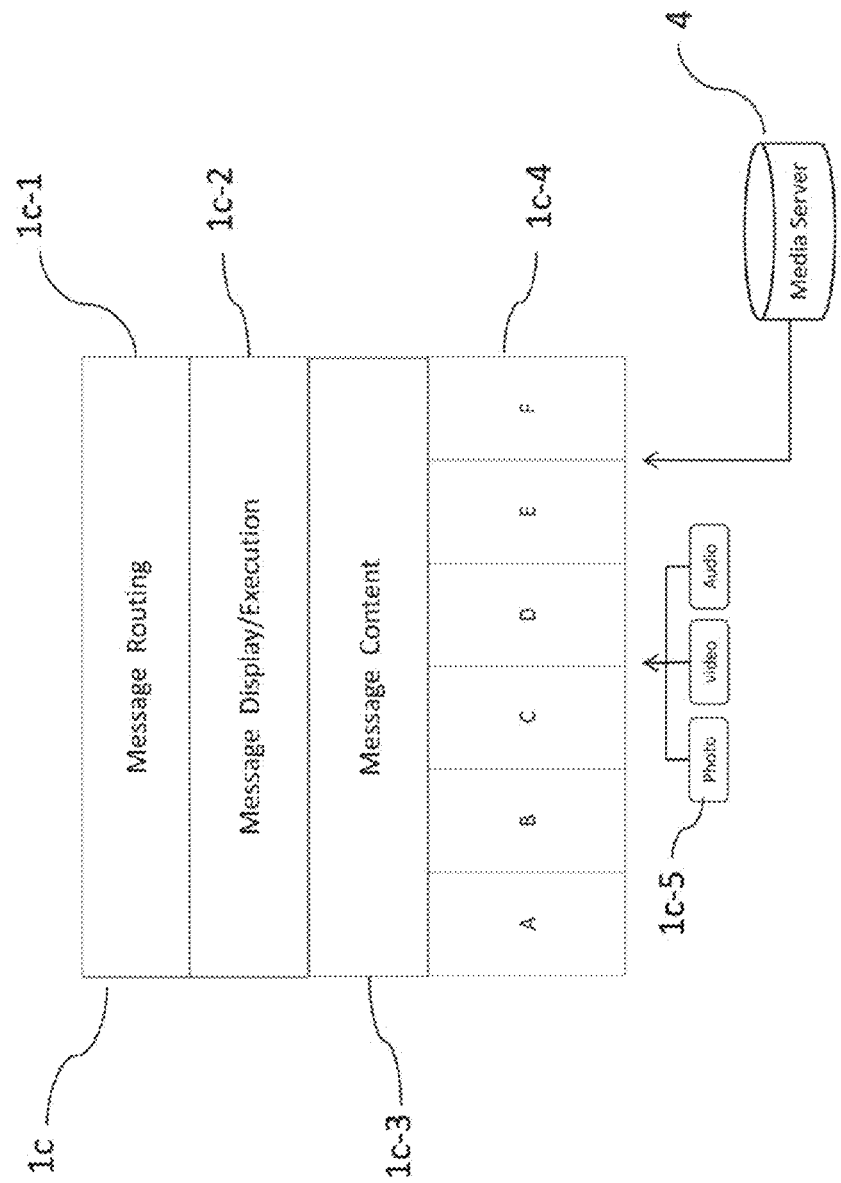
FIG. 5 is a high-level logical view of the Multi-Frame Message in the present invention.

FIG. 5 shows a logical view of a Multi-Frame Message (1*c*), which expands upon the diagram of, "Smartphone/Personal Cellular Device" (1), FIG. 2. It is comprised of Message Routing/Sending information (1*c*-1), Message Display/Execution information (1*c*-2), Message Content information (pointers, etc.) (1*c*-3), and specific media file data (1*c*-4). Message content may originate locally from Smartphone device media content storage/memory (1*c*-5), where specific media files may be accessed. Live Photos, Video and/or Audio may also be included. Message content may also originate from an external source such as, Media Server/Media Content Storage (4) The MFM (1*c*) can be separated into multiple sections, where Message Routing information (1*c*-1), Message Display/Execution information (1*c*-2), Message Content information (pointers, etc.) (1*c*-3)

and specific media file data (1c-4) may be manipulated and transmitted independently or in combinations to minimize message display latency, or to allow for editing, updating, etc.

Audio: Further expanding upon audio data described herein, specific files may be associated with individual frames and/or with the entire MFM (over all frames in a message). As with other multimedia elements/components of the MFM, described herein, an audio file may remain discrete in the message (unless it was not originally discreet—as with a rendered video clip that contains an audio track). Thus, volume levels, start and stop points, etc. are dynamic, allowing additional utility and freedom in composing a message. An example novel benefit of this embodiment is that a user who views a message may elect to view a specific frame, after they have viewed the full message. In this case, the user is able to listen to the audio associated with the specific frame; independent of the audio associated with the entire MFM (i.e. the audio associated with the full MFM could be removed, muted, or reduced in volume, etc.). Isolating the audio for a given frame allows the user to better understand or hear the audio of a specific frame. Also, additional audio, such as an advertisement or information could be added (or updated or removed) within the MFM after the message is generated, saved, sent, etc. In this case, an advertisement or information can be dynamically integrated into the MFM, allowing message audio to be optimized so that it is pleasing and understood by the recipient. Another innovation of this embodiment is that a user is able to reuse frames with audio associated in future messages. For example, a recipient may view/listen to an MFM and decide to use a specific frame in a new message composition. With the system described herein, this is possible. The individual frame (or multimedia component within the frame) can be extracted from the full MFM.

Figure 3:
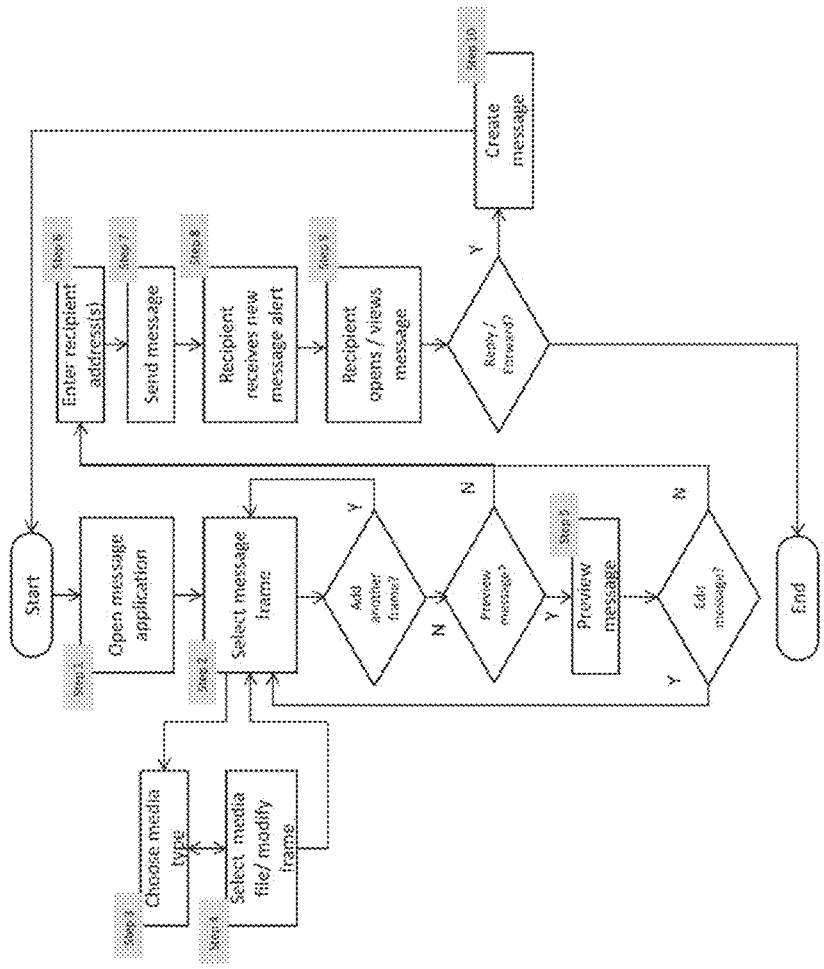
FIG. 3 shows general application workflow of an embodiment of the present invention.

Functionality described above fits into the message workflow model ("Flowchart") shown in FIG. 3 (Steps 3, 4). In addition, the capability to add audio over the entire MFM is an expanded aspect of the "Preview Message" function (Step 5). At the point of Message Preview, where an MFM has been initially created (as a draft message), a framework exists for audio to applied across the full message.

Media Correction/Update

An embodiment may also incorporate a media correction/update function. This would include media aspects such as file type and size. The application would incorporate a sizing function, such that media of non-standard size and length (if applicable), are automatically sized to meet application requirements. Media may also be adjusted to optimize file size, resolution, etc., which could affect display quality, load time and other aspects of message presentation. This aspect of the invention addresses the issue of user's adding non-standard media to frames.

Message Design/Utility

An embodiment of this invention seeks to create a unique messaging capability, where users are able to communicate thoughts, ideas and meaning through a series of distinct frames of information, that are associated to convey a cohesive, singular message. There are various core components to message delivery in this invention. The core components of message delivery include: 1) Initial presentation of concealed blocks (representing unique units of hidden information), 2) Reveal and emphasis of individual units of information (frames), 3) Proximal positioning of revealed frames (containing units of information). During message delivery, the message recipient is presented with a number of opaque/solid bocks (frames) on the Smartphone/PCD device that represent and correspond to frames of information to be revealed. These initial frames communicate to the user that there are a specific number of units of information, or "frames" to be presented in the message (conveyed by the number of opaque/solid blocks displayed on the screen). The opaque, or hidden nature of the frames displayed also conveys that information is hidden and will be revealed, adding to the impact and value of the message. Thus, interest and anticipation is generated with the recipient, in this component/step. When information for a block is revealed, the frame is enlarged to enhance visual impact, and may optionally play a motion clip (video, animation, etc.). This component/step in message delivery serves to satisfy/address the recipient's curiosity or interest in each specific units of the message. Once the frame has been revealed and emphasized, it is repositioned at a reduced size, in proximity to the other frames that comprise the message. Proximity to other frames in a singular display enhances the meaning/impact of the message, as the recipient can view the message in its entirety and associate information from all frames, to interpret them as a singular message. To further enhance the recipient's ability to decode the message, an embodiment of this invention may include a function for the recipient to select individual frames, enlarge them, and replay (if applicable) to further study frame content/information. Therefore, given the tangible effect and utility of the core components described, it should be apparent that an embodiment of this invention provides a unique and improved method to communicate thoughts, ideas, meaning via an electronic communications platform.

It should also be understood that a multitude of frame display patterns and presentation variations may be incorporated to achieve the desired effect, as described herein. For example, a user may be required to tap on a block to reveal its contents, or frames could be displayed in a variety of patterns, such as spinning or sliding into place. Frames could also be displayed manually, where a user would scroll or swipe frames to view subsequent frames.

Frames Design

In an embodiment (FIG. 4), frames screen design (placement, number and size) is functionally important to the presentation of the MFM message. Specifically, frames, represented as blocks on the Smartphone/PCD screen, must be sized to effectively/optimally display information (when revealed). In general, a configuration of 9-12 blocks (15, 16) displayed on a typical Smartphone screen is the preferred, maximum amount for an embodiment. However, if a message contains fewer frames, the number of blocks should vary according to the specific number of frames. If 1 frame of information is used, 1 block (10), enlarged and centered in the screen should be used. If 2 frames of information are used, 2 blocks (11), enlarged and positioned such that one is on top of the other in the center of the screen, should be used. For 3 frames of information, a 3 block configuration (12) should be used, where 2 blocks sit on top of the $3^{rd}$ block, utilizing a majority of the available screen. For 4 frames of information, a 4 block configuration (13) should be used (using a majority of space available on the screen). 5 or 6 frames should use 6 blocks (14), in the same manner. 7-9 frames should use a 9 block configuration (15), and 10-12 frames should use a 12 block configuration (16).

Figure 4:
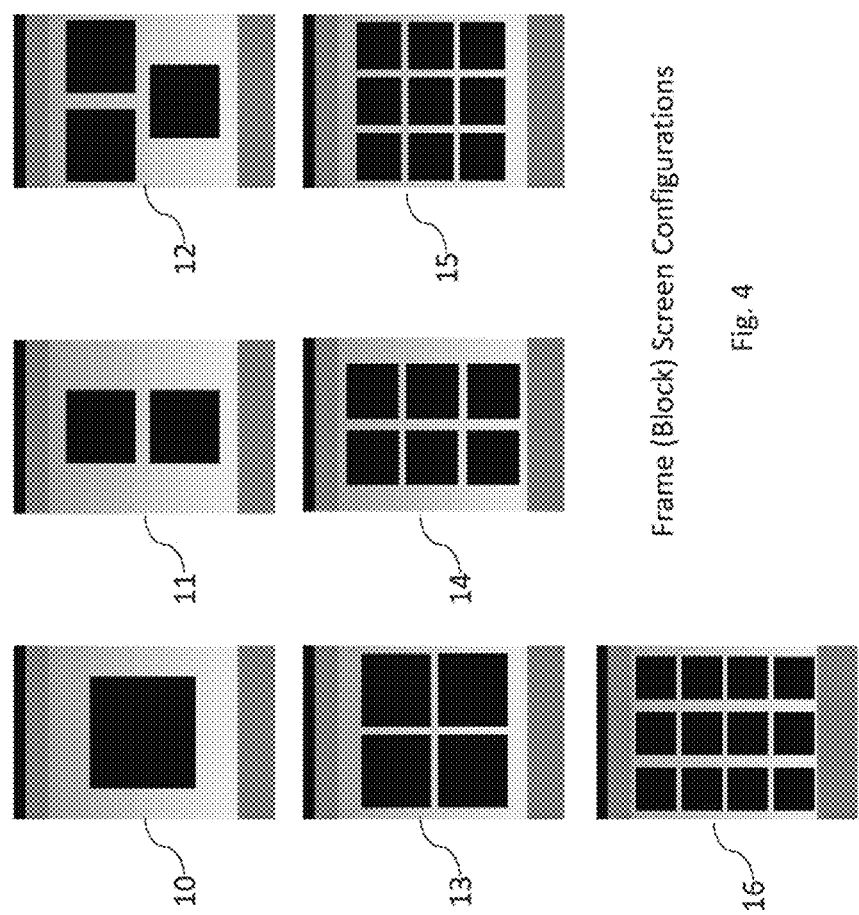
FIG. 4 shows an example frames screen design for presentation of a message according to an embodiment of the present invention.

Master Frame: Expanding upon Frames Design, MFM frames, as shown in FIG. 4, may be arranged within a graphical structure in order to enhance the perception and utility of the multi-frame message as a single, cohesive message—creating a visual representation of the MFM, where it functions as, and is perceived by the user as a cohesive, single message, as opposed to a set of independent frames. To support this, a graphical representation of a "Text Bubble" or "Talk Bubble" is incorporated to associate individual frames. This aspect of the invention is referred to as a "Master Frame", within which graphics and functions for individual frames are contained. Thus, when an MFM plays, the display of individual frames originate from within the Master Frame and then end within the same Master Frame. The Master Frame can also provide additional information regarding the MFM, such as "Unread Message" and "Important" indicators, etc. This may be achieved through specific colors, flashing graphics, text on or within the frame, etc. The Master Frame also functions as a container for other information and functions. This is an important aspect of the Multi-Frame Message, as it allows specific information to be clearly and effectively associated with the MFM. Functions such as URL links or buttons can also be bundled with the MFM, within the Master Frame. Examples would be: a link to a Web site, Reply and Forward functions, Replay and Cancel functions. Volume, playback speed of the message and other message functions can also be controlled via the Master frame. This provides the utility of visually and functionally defining the boundary of the MFM. The Master Frame also allows operations to be executed on the entire MFM, as opposed to individual frames. An example would be dragging and dropping the entire message into a file.

Figure 6:
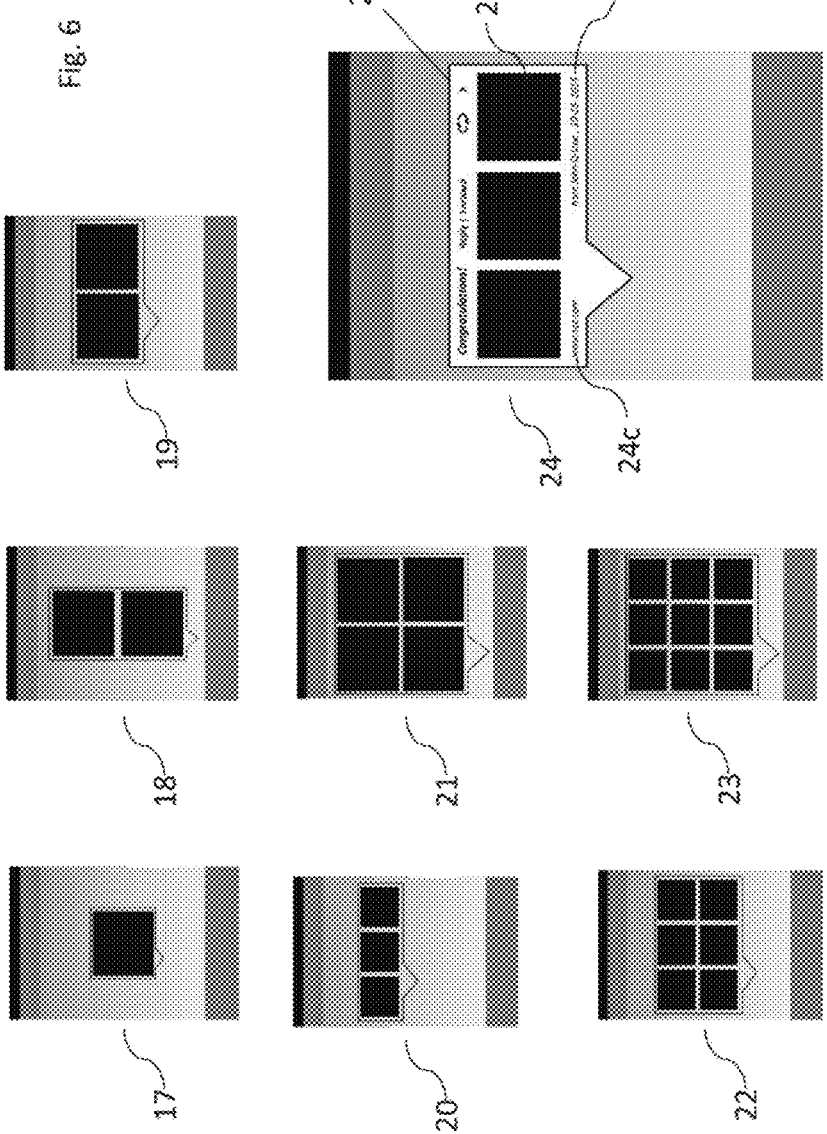
FIG. 6 shows example embodiments of the Master Frame for the Multi-Frame Message in the present invention.

FIG. 6. shows examples of Master Frame configurations. A Master Frame containing a single frame is shown (17), a Master Frame containing two vertical frames is shown (18), a Master Frame containing two horizontal frames is shown (19) a Master Frame containing 3 frames is shown (20), a Master Frame containing 4 frames is shown (21), a Master Frame containing 6 frames is shown (22), a Master Frame containing 9 frames is shown (23), and a Master Frame containing 3 frames is shown (24) with examples of additional information, such as a senders name, date, etc. (24*d*) and functions, such as URL (link), action button (executes code), etc. (24*c*) contained within the Master Frame. Frames (24*b*) are shown within the Master Frame perimeter (24*a*). It should be understood that any number of frames may be contained within a Master Frame, depending on the message size and available space. It should also be noted, as illustrated by examples 18 and 19 (FIG. 6), that the configuration of frames may be vertical or horizontal.

It should also be noted that graphically, the Master Frames shown in FIG. 6 may also have rounded corners, may be drawn in any color, or with multiple colors or shading and stems may be angled in either direction. Stems may also be straight or curved, and may be any length. The Master Frame may also be solid, or simply represented with an outline. The Master Frame may also be represented 2 dimensionally or 3 dimensionally. Further, the sides of the Master Frame may be straight, curved, angled, etc., and they may be contiguous or dashed. These graphic characteristics may also apply to the representation of the Master Frame shown embedded as an icon in FIG. 7, (26).

It should be apparent to the reader that the design and technological features regarding, "Master Frame", relate directly to message display designs shown in FIG. 4 and apply to information under, "Frames Design". Such examples may be integrated with Master Frame design and utility, as described herein. The Master Frame expands upon the frame configurations shown, where any of the frame configurations may be inserted into/integrated with a Master Frame.

Example Variations of Embodiments

An embodiment describes a message that is created and completed by a singular user. However, a variation of this functionality is to create "open ended" messages, where one user initiates a message and other users append frames to this message. The net effect of this is to create a "chain" or "storyline" message. A user would open a message and append additional frames and then forward (or reply to) the message. This function could be executed in series (one user at a time) or in parallel (multiple users may append frames).

Alternative Structure for a Multi-frame Message: Elaborating on the, "open ended" message structure above, 1 or more frames from multiple users who are communicating with each other can be linked in series. Here, the display of an MFM includes frames from 1 or more other users. In this case, a message is initiated, and replies to that message are received and displayed in series, next to or below that message. Therefore, the MFM message appears as a contiguous collection of frames on the application screen. This variation of the invention has the advantage that a message conversation may be executed without leaving the current application screen. When a reply message is received, it displays simply as a series of frames, or it can alternatively be contained within a Master Frame. Typically, regardless of display formatting, the MFM would be viewed when the user taps the frames or Master Frame. However, the MFM could also play automatically when received.

In addition, this aspect of the invention may also be integrated with the feature of the Master Frame.

While an embodiment employs a central Application Management Server to provide message viewing functionality via the Smartphone/PCD application, messages could alternatively be coded in other formats, such that messages could be accessed and viewed via linked or embedded files within other platforms such as email, text messages, proprietary messaging systems, etc.

Embedding a Multi-frame Message in another Messaging System: An MFM may be embedded within another messaging system. This allows users to benefit from the native features of other messaging systems, while being able to benefit from the unique features of the MFM messaging system. In an embodiment, a user initiates an MFM during a typical messaging communication with another user. A connection is made to the MFM Central Application Management Server, allowing the user to compose an MFM from within a specific message, within the active messaging application. This is typically done via an Application Programming Interface (API). When the User completes the message, it is processed via the Central Application Management Server. An icon representing, and linked to the MFM, is generated and embedded within the specific message in the message communication, within the active messaging application. When the message is sent, and then received by another user, that user can tap/click on the MFM icon to open, view and reply to the MFM, again within the active messaging application.

Figure 7:
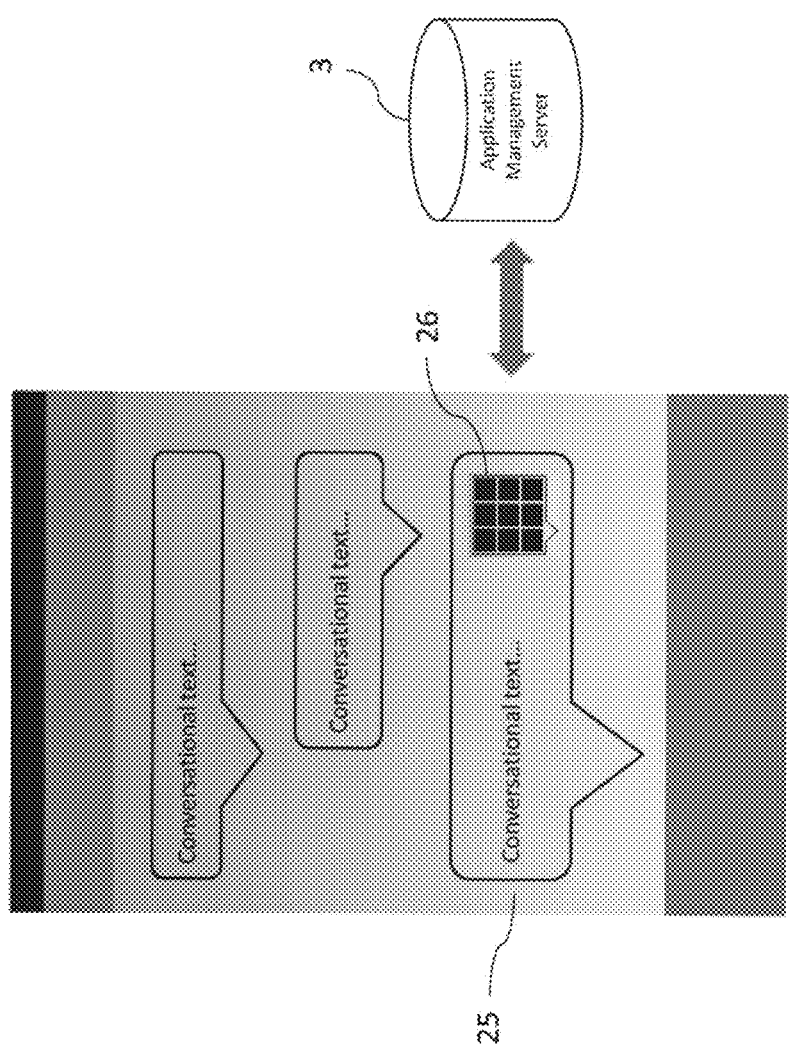
FIG. 7 is a high-level illustration of an embodiment of the present invention, where a Multi-Frame Message link is embedded in, and triggered from within another messaging system.

FIG. 7 shows an example text conversation within an external messaging system, where a Multi-Frame Message link (26) is embedded within the messaging application (25). The MFM link connects to the Application Management Server (3), which receives and stores MFM data from the local MFM application and provides MFM data back to the external messaging system when called.

Note: It should be understood that as an alternative to an embedded link, a full, self-contained MFM can be embedded in an "Over-The-Top" (OTT) type message (or similar type message). MFM data may be stored locally and processed by a local instance of the MFM application.

Alternative Method to View a Multi-Frame Message: An MFM file may be reformatted in order to provide a method for MFM message recipients, who do not have the MFM application, to view a representation of the MFM message. The resulting file would be embedded in another platform such as email, text messages, etc. In this embodiment, the discrete MFM message may be converted into a video format that is viewable with a mobile web browser. In this case, when a user sends an MFM message to contacts stored in the user's smartphone, the MFM application is able to query the Central Application Management server and determine which contacts have installed the MFM application. If recipients exist who do not have the MFM application, a background routine runs that converts the MFM to a video format, as described above. Therefore, when a recipient who does not have the MFM application receives a message alert via email, text message, etc., he will be able to follow a link to view a video representation of the MFM. Further, the system will provide the referenced recipient an option to load the application to view the actual MFM, reply and so forth.

An embodiment may also include functionality enabling users to post frame files that can be accessed and used by other users to create MFM messages. These files may be made available for a fee or free of charge. This would typically be accomplished by consolidating all media files on a centralized Media Server and then executing appropriate financial transactions via a Financial Transaction process managed by the Application Management Server. It should be understood that alternatively, media files may be located on multiple Media Servers, with the Application Management Server directing and managing access to those servers. In this way, third party media providers can make media files available through their own servers. It should be noted that in this embodiment, the Financial Transaction process would also be applied, as appropriate. Typically, it would be inserted/managed by the Application Management Server. Transactions could be executed within the Application Management Server, or by a third party.

Pre-Constructed Multi-Frame Messages: Elaborating on the capability enabling users to post frame files, and where third party media providers can make media files available, MFM message files may be "pre-constructed". Since MFM's, as described herein, are dynamic and may generally be edited, updated and/or modified, it is another aspect of this invention to incorporate pre-constructed messages that users may modify, personalize, etc. These pre-constructed messages are essentially message templates that provide ready content for "out-of-the-box" use or customization. A typical type of template would be an MFM "Greeting Card". In this case, a user might purchase an MFM Greeting Card and modify it to include personal information, images, video or audio. The user would benefit from pre-constructed frame content, as it would potentially enhance the quality/impact/value of the message. In addition to full MFM message templates, individual frames can be preconfigured. As an example, a third party vendor could provide content in the form of pre-constructed frames. Users would be able to purchase such a frame and modify its associated media files, such as changing the associated audio. Further, frames could be packaged with multiple audio (or other media content) options, and the user would select the desired audio file when using the frame in an MFM. This expands upon this capability by utilizing multiple frames to create a full, pre-constructed MFM message.

As an enhancement, an embodiment may also leverage Global Positioning Satellite (GPS) functionality. Visibility/access to galleries could be based on a user's location. For example, a business could allow users to include distinctive media (such as a badge or unique animated display) in a message based on the user's location. This could serve as a means for a user to share proof of destination or achievement with message recipients. GPS messages could also be sent based on user's location. Further, content of a message (specific frames) could be determined by a user's location, or by a series of location points.

In addition, frame composition/content in a message could be determined by other data available for a user. For example, a hotel might send a user's "Welcome" message and include frames based on available user preference data, such as locations visited, purchases made, web pages viewed, historical data captured, etc.

Likewise, advertising could be introduced into frames (or other aspect of the message delivered) based on user data.

Further, data about users could be mined from frames that users have incorporated into their messages. For example, if a user routinely includes an image of a dog in his/her message, it might suggest that it would be appropriate to deliver advertising regarding products or services relating to dogs to that user.

Calculating Frames based on other Frames in the MFM: Expanding upon the capability to mine and manipulate frame data, display frames may be manipulated/processed based on the content or characteristics of other frames in the multi-Frame Message. This aspect of the invention provides a means to determine the content and/or behavior of a frame, or frames, based on other frames selected in the MFM message. For example, an advertisement for a pizza restaurant chain might challenge patrons to create an MFM message to send to friends, where users "build their own pizza" by selecting appropriate pizza images. Frames selected by the User might be ingredients such as "cheese," "pepperoni", "anchovies", etc. When the message is played, an additional frame is determined based on the frames selected and is then appended to the message. In this example, a fully made pizza with cheese, pepperoni and anchovies would display. A variation on this example would be to display a coupon or prize based on frame selection or combination.

It should also be noted that all frames in an MFM message can be configured to display a final, single image, or play a single animation or video clip (motion display). In the previous example, rather than a pizza displaying in an additional frame, an image of a pizza would display across all frames, after the message has completed. In this case, a single image of a pizza would be apportioned across all frames. Note that this aspect of the invention, displaying an image or video across all frames in an MFM can apply to any other aspect of this invention. It should also be understood that this effect can be applied to any image, animation or video and be achieved dynamically via processing by the MFM application.

Externally Triggering a Multi-Frame Message

Another aspect of a present invention embodiment is to provide a system/method to deliver advertising and/or information in the form of a Multi-Frame Message, and further, to trigger such a message by scanning a Quick Reference (QR) code (or similar readable code), or via a Near Field Communication (NFC) transmission.

The Multi-Frame Message is particularly well suited for the presentation of advertising and/or information. In another embodiment of this invention, the system is expanded to incorporate external triggers. Such triggers include, scanning of a barcode such as a Quick Reference (QR) code, or Near Field Communication (NFC) transmission. In either case, an MFM is associated with a specific trigger, which invokes a process to deliver a specific message back to the source device. For example, a user may scan a QR code in an advertisement, which would result in the user receiving a specific MFM related to that advertisement. It should also be noted that a QR code can also be embedded in a frame, such that a user who views the MFM message is able to scan the QR code.

In another example, a user might be in the vicinity of an NFC transmission such that the user's device receives the NFC transmission and initiates a process to call a specific MFM message. Because the MFM is generated dynamically, advertising and/or information can be delivered dynamically, such that it can be tailored specifically to the user, device, location, date, time, etc. For example, the message could be personalized such that the user's name is dynamically embedded in a frame (within the message) and viewed as an integrated part of the message. Further, a user might walk by a vending machine that transmits an NFC transmission. When triggered, the MFM generated might display the status of soft drink inventory, within the message display.

In addition to providing static advertising content in a frame, active functions can be incorporated. For example, a URL or function button can be incorporated. In this case, a user could tap on a frame to connect to a Web site, or tap on a button to initiate an action, such as purchase goods or services. In addition, user behavior can be and tracked by capturing user interactions with MFM frames, such as tapping a URL or button.

Figure 8:
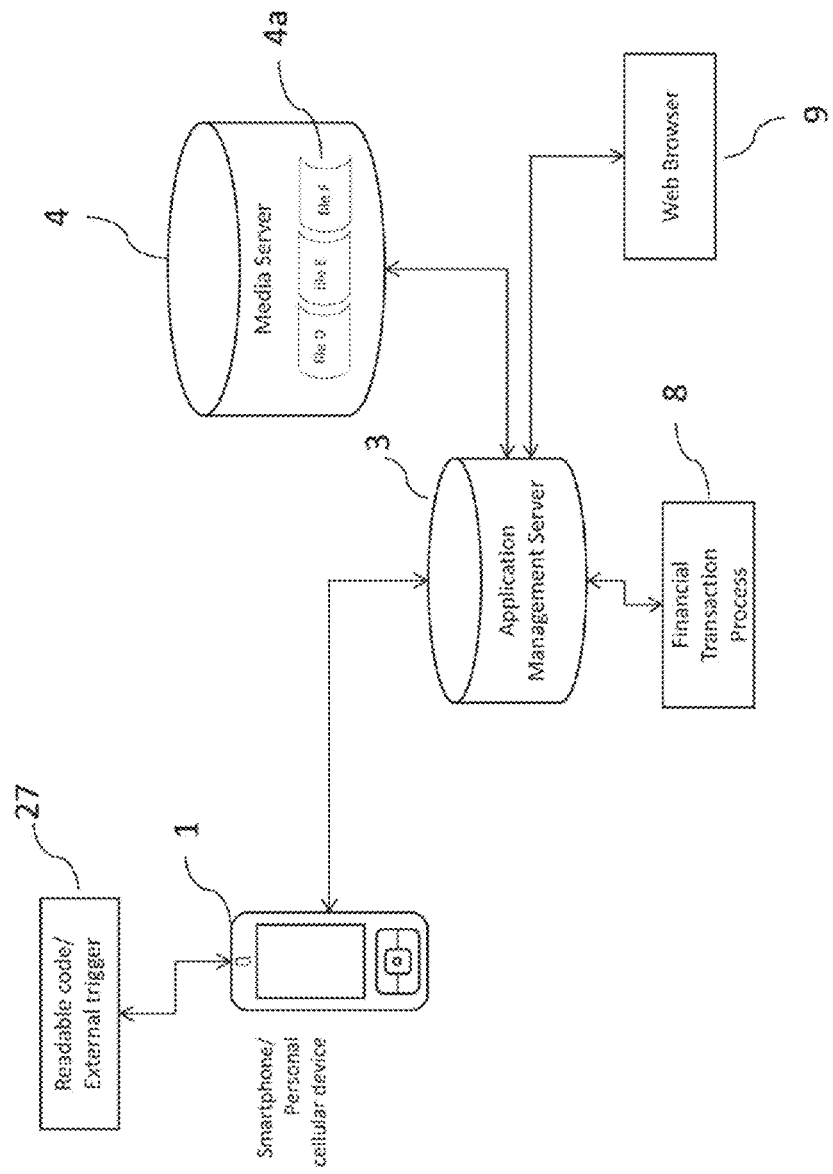
FIG. 8 is a high-level logical view of triggering a Multi-Frame Message from an external system.

FIG. 8 shows a Smartphone (1) reading an external code, or being triggered via external signal (27), such as QR code or NFC transmission. The trigger initiates a request. The MFM application, resident on the smartphone (1) processes the request via the Application Management Server (3). The Application Management Server (3) pulls requested MFM file(s) (4a) from the Media Server (4). MFM files are provided back to the Smartphone (1). The user may further act upon the MFM provided, such as to make a purchase. The purchase request is routed through the Application Management Server (3) to the Financial Transaction Process (8). In addition, vendors wishing to deliver content via an external trigger may use Web Browser (9) of a client system to initiate the purchase of MFM delivery (advertising, information, etc.), via the Application Management Server (3).

An embodiment would typically include a function to manage user accounts, messages, contacts, etc. This would typically exist on the Application Management Server.

Any functionality and/or data located on external servers, such as the Application Management Server or Media Server, may reside locally on the user's Smartphone/PCD, as appropriate.

Other embodiments may also include enhanced messaging features such as: full screen displays prior to, and/or after the MFM message as described, herein. This would typically be used for business applications, where an individual or business wanted to include a standard, formatted business letter, document or graphical representation in respect to their business, in conjunction with the core presentation of frames. The message could also optionally include hyperlinks (or equivalent) that would allow the recipient to access business web pages, applications, etc. These links could further be activated automatically to provide a seamless presentation.

In addition, other embodiments may include an enhanced capability to track recipient viewing of messages. The number of views, number of times replayed, frames selected (to enlarge/replay), etc. could be captured and tracked.

The environment of the present invention embodiments may include any number of computer or other processing systems or devices (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system or device (e.g., desktop, laptop, PDA or tablet, mobile devices, etc.), and may include any commercially available operating system and any combination of commercially available and custom software. These systems may include any types of displays and input devices (e.g., virtual or physical keyboard, mouse, voice recognition, touch screen, etc.) to enter and/or view information.

The server systems and other processing devices may be implemented by any conventional or other computer systems preferably including at least one processor, one or more memories and/or internal or external network interfaces or communications devices, and any commercially available and custom software. The software of present invention embodiments may include one or more modules or units to perform the various functions of present invention embodiments described above. The various modules may be implemented by any combination of any quantity of software and/or hardware modules or units, and may reside within memory of the server and/or other processing devices for execution by the processor.

It is to be understood that the software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems or devices may be distributed in any manner among any number of software and/or hardware modules or units, processing or computer systems or devices and/or circuitry, where the computer or processing systems or devices may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The network may be implemented by any number of any type of communications network (e.g., LAN, WAN, Internet, Intranet, VPN, etc.). The computer or other processing systems or devices of the present invention embodiments may include any conventional or other communications devices to communicate over the network via any conventional or other protocols. The computer or other processing systems or devices may utilize any type of connection (e.g., wired, wireless, etc.) for access to the network. Local communication media may be implemented by any suitable communication media (e.g., local area network (LAN), hardwire, wireless link, Intranet, etc.).

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, virtual or physical keyboard, touch screen, etc.). The interface screens may include any suitable actuators (e.g., links, tabs, etc.) to navigate between the screens in any fashion.

While the foregoing written description enables one of ordinary skill to make and use embodiments of the invention, those of ordinary skill will understand and appreciate the existence of variations, combinations, and equivalents of the specific embodiments and examples herein. The invention should therefore not be limited by the above described embodiments and examples.

What is claimed is:

1. A method of communicating messages comprising:
   receiving, via a processor, a message including a plurality of multimedia frames arranged in an order for sequential presentation, wherein each multimedia frame includes one or more selected objects with media content and corresponding execution instructions for presenting the one or more selected objects of that multimedia frame, wherein each multimedia frame is an individually manipulable component within the message, and wherein at least one multimedia frame includes a plurality of the selected objects with different types of media content that are executed simultaneously and layered in accordance with the corresponding execution instructions; and
   communicating, via a processor, the message including the multimedia frames, wherein the communicating includes:
      presenting the message as an animation of a contiguous series of the multimedia frames by sequentially presenting in the order each multimedia frame of the message in accordance with the corresponding execution instructions.

2. The method of claim 1, wherein the message includes a set of audio files played over all of the multimedia frames during presentation of the message.

3. The method of claim 1, wherein each of the multimedia frames are initially concealed, and presenting the message further comprises:
   revealing each individual concealed multimedia frame of the message sequentially in the order for presentation.

4. The method of claim 3, wherein presenting the message further comprises:
   repositioning each multimedia frame in a reduced size among the plurality of multimedia frames of the message in the order for presentation after revealing that multimedia frame, wherein the message is presented in an entirety after revealing each of the multimedia frames.

5. The method of claim 1, wherein communicating the message further comprises:
   embedding one of the message and a link to the message within a communication of another messaging system; and
   transmitting the communication to a designated recipient.

6. The method of claim 1, wherein the message includes at least one multimedia frame with advertising information.

7. The method of claim 1, wherein the message further includes routing information, and communicating the message further comprises:
   transmitting the execution instructions and routing information prior to transmission of the multimedia frames to initiate execution of the message at a designated recipient before receipt of the multimedia frames.

8. The method of claim 1, wherein presenting the message further comprises:
   presenting an image across each multimedia frame upon completion of the message.

9. The method of claim 1, further comprising:
   adjusting duration of a multimedia frame to comply with a predetermined parameter.

10. A program product apparatus for communicating messages comprising:
    a computer readable storage device having computer readable program code embodied therewith, the computer readable program code comprising computer readable program code configured to:
       receive a message including a plurality of multimedia frames arranged in an order for sequential presentation, wherein each multimedia frame includes one or more selected objects with media content and corresponding execution instructions for presenting the one or more selected objects of that multimedia frame, wherein each multimedia frame is an individually manipulable component within the message, and wherein at least one multimedia frame includes a plurality of the selected objects with different types of media content that are executed simultaneously and layered in accordance with the corresponding execution instructions; and
       communicate the message including the multimedia frames, wherein the communicating includes:
          presenting the message as an animation of a contiguous series of the multimedia frames by sequentially presenting in the order each multimedia frame of the message in accordance with the corresponding execution instructions.

11. The program product apparatus of claim 10, wherein the message includes a set of audio files played over all of the multimedia frames during presentation of the message.

12. The program product apparatus of claim 10, wherein each of the multimedia frames are initially concealed, and presenting the message further comprises:
    revealing each individual concealed multimedia frame of the message sequentially in the order for presentation.

13. The program product apparatus of claim 12, wherein presenting the message further comprises:

repositioning each multimedia frame in a reduced size among the plurality of multimedia frames of the message in the order for presentation after revealing that multimedia frame, wherein the message is presented in an entirety after revealing each of the multimedia frames.

14. The program product apparatus of claim 10, wherein communicating the message further comprises:
    embedding one of the message and a link to the message within a communication of another messaging system; and
    transmitting the communication to a designated recipient.

15. The program product apparatus of claim 10, wherein the message further includes routing information, and communicating the message further comprises:
    transmitting the execution instructions and routing information prior to transmission of the multimedia frames to initiate execution of the message at a designated recipient before receipt of the multimedia frames.

16. The program product apparatus of claim 10, wherein presenting the message further comprises:
    presenting an image across each multimedia frame upon completion of the message.

17. The program product apparatus of claim 10, wherein the computer readable program code is further configured to: adjust duration of a multimedia frame to comply with a predetermined parameter.

18. A system for communicating messages comprising:
    at least one processor configured to:
        receive a message including a plurality of multimedia frames arranged in an order for sequential presentation, wherein each multimedia frame includes one or more selected objects with media content and corresponding execution instructions for presenting the one or more selected objects of that multimedia frame, wherein each multimedia frame is an individually manipulable component within the message, and wherein at least one multimedia frame includes a plurality of the selected objects with different types of media content that are executed simultaneously and layered in accordance with the corresponding execution instructions; and
        communicate the message including the multimedia frames, wherein the communicating includes:
            presenting the message as an animation of a contiguous series of the multimedia frames by sequentially presenting in the order each multimedia frame of the message in accordance with the corresponding execution instructions.

\* \* \* \* \*